United States Patent [19]
Koop et al.

[11] Patent Number: 5,667,658
[45] Date of Patent: Sep. 16, 1997

[54] MASTER FOR THE DUPLICATION OF SOUND RECORDINGS AND PROCESS FOR ITS PRODUCTION

[75] Inventors: Hermann Koop, Ronnenberg; Wolf-Eckhart Fritsche, Kleinostheim; Bernd Hensel, Eschborn, all of Germany

[73] Assignee: Leybold Aktiengesellschaft, Hanau, Germany

[21] Appl. No.: 617,505

[22] Filed: Mar. 15, 1996

[30] Foreign Application Priority Data

Mar. 20, 1995 [DE] Germany ............... 195 10 096.4

[51] Int. Cl.[6] ........................................ C25D 1/10
[52] U.S. Cl. .................. 205/50; 205/67; 205/68; 205/70; 204/192.15
[58] Field of Search ................. 205/67, 68, 70, 205/186, 50; 204/192.15

[56] References Cited

U.S. PATENT DOCUMENTS 4,552,820  11/1985  Lin ................................ 428/611
5,006,058   4/1991  Maruyama et al. ............. 425/556
5,015,388   5/1991  Tabuchi ............................ 205/70

FOREIGN PATENT DOCUMENTS 138088  7/1985  Japan.

*Primary Examiner*—John Niebling
*Assistant Examiner*—Brendan Mee
*Attorney, Agent, or Firm*—Felfe & Lynch

[57] ABSTRACT

A plate made of silicate glass (glass master) (3) is provided with a pressing surface (surface coat) carrying the sound recording in the form of raised contours formed from a photoresist (5) with a layer of primer (adhesion promotor) (4) to hold the photoresist layer (5) to the glass plate (3). A first metal layer (6) is deposited on the photoresist (5) from a sputter target which consists of a NiV alloy; and a protective layer (7) of nickel is electrolytically deposited on the first layer. The metal master (8) consisting of first layer (6) and protective layer (7) is pulled from the photoresist layer (5).

6 Claims, 1 Drawing Sheet

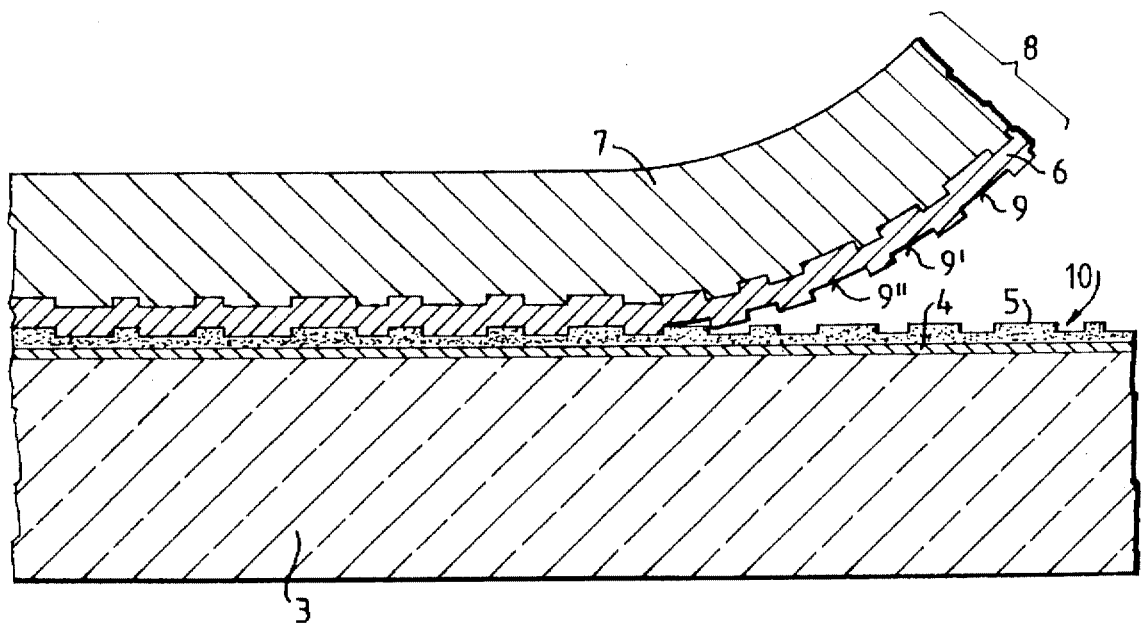

MASTER FOR THE DUPLICATION OF SOUND RECORDINGS AND PROCESS FOR ITS PRODUCTION

BACKGROUND OF THE INVENTION

The invention pertains to a master for the duplication of sound recordings in the form of pits arranged in a spiral on a circular carrier disc and to a process for the production of the master itself by the use of a plate made of silicate glass with a pressing surface carrying the sound recording in the form of raised contours formed from a developed photoresist. A layer of primer holds the photoresist to the surface of the glass plate, a first layer of metal covers the pressing surface, and a protective layer of metal covers the first layer on the outside.

Layers of nickel or silver which have been sputtered onto the applied and developed photoresist layer or onto the exposed and developed positive resist surface, the nickel or silver layers being reinforced with thicker Ni layers deposited by electrolytic processes, are known.

A disadvantage of the known processes for the production of masters is attributable to the property of the photoresist layer to adhere at least partially to the master after the master has been separated from the layer of photoresist. This leads to serious problems in the following production of the carrier disks (CD's), because residues of the photoresist layer or of the primer could remain on the carrier disks which are pressed later on.

SUMMARY OF THE INVENTION

The first layer is designed in such a way that it is guaranteed that the master can be easily separated from the layer of the photoresist, without any residues of primer or residues of the photoresist layer remaining stuck to the master.

This is accomplished by depositing the first layer applied to the photoresist by sputtering a target which consists of a NiV alloy, the amount of vanadium being in the range of 3–30%.

In place of a target alloy of Ni and V, it is also possible to use a target consisting of an alloy of Ni with diamagnetic metals. The alloy should be selected so that it has a high affinity for oxide formation.

BRIEF DESCRIPTION OF THE DRAWING

The sole FIGURE is a schematic section view of the finished stamping master being removed from the glass master.

DETAILED DESCRIPTION OF THE PREFERRED EMBODIMENT

The production of the master (stamper) for the inject-molding of compact discs (of polycarbonates, for example) is carried out with the help of a glass plate 3, on one of the sides of which a primer (adhesion promotor) 4 and a light-sensitive layer (photoresist layer) 5 are applied (coated plate). A laser beam is then directed onto the coated plate (exposure by laser beam), which is then developed (developed glass master). A thin layer 6 of NiV (3–30% V) is then sputtered from a target consisting of a NiV alloy onto photoresist layer 5 in a vacuum. The NiV layer has a thickness between 600 and 2000 Angstroms, preferably 1100 Angstroms. Next, this NiV layer 6 is considerably reinforced by a Ni Layer 7 (with a thickness of, for example, 300μ), which is deposited electrolytically. Finally, master 8 is pulled off (separated) from photoresist layer 5. It can be laid on the mold of the injection-molding machine, or duplicates (daughters) of master 8 (nickel master) can be made electrolytically by means known in themselves, and these daughters can be laid on the mold.

The significant advantages of the alloy (NiV) used for the first metal layer are that it adheres comparatively weakly to the photoresist layer and that this NiV alloy also allows the use of thick-walled targets, which therefore have a proportionately longer service life.

What is claimed is:

1. Process for producing a master for the duplication of sound recordings, said process comprising providing a support plate of silicate glass, applying a layer of primer to said support plate, said primer promoting adhesion between said support plate and a photoresist, applying a layer of photoresist to said layer of primer, developing said photoresist to form raised contours in said layer of photoresist, applying a first metal layer of nickel vanadium alloy directly to said layer of photoresist by sputtering a target consisting of an alloy of nickel and vanadium, applying a protective metal layer of nickel to said first metal layer by electrolytic deposition, and pulling said first layer and said protective layer from said layer of photoresist, said first layer and said protective layer as a unit forming a metal master for duplicating sound recordings.

2. Process as in claim 1 wherein said target contains 3 to 30% vanadium.

3. Process as in claim 1 wherein said first layer is applied to a thickness between 600 and 2000 Angstroms.

4. Master for the duplication of sound recordings, said master comprising a first layer consisting of an alloy of nickel and vanadium, said first layer having a surface provided with pits which provide information for the sound recording being duplicated, and a protective layer of nickel covering said first layer on a surface opposite from said surface provided with pits.

5. Master as in claim 4 wherein said first layer contains 3 to 30% vanadium.

6. Master as in claim 1 wherein said first layer has a thickness between 600 and 2000 Angstroms.

* * * * *